US012659871B2

(12) United States Patent
Yuan et al.

(10) Patent No.: US 12,659,871 B2
(45) Date of Patent: Jun. 16, 2026

(54) MAXIMUM PERMISSIBLE EXPOSURE REPORTING

(71) Applicant: QUALCOMM Incorporated, San Diego, CA (US)

(72) Inventors: Fang Yuan, Beijing (CN); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 504 days.

(21) Appl. No.: 18/252,412

(22) PCT Filed: Jan. 15, 2021

(86) PCT No.: PCT/CN2021/072179
§ 371 (c)(1),
(2) Date: May 10, 2023

(87) PCT Pub. No.: WO2022/151356
PCT Pub. Date: Jul. 21, 2022

(65) Prior Publication Data
US 2024/0015663 A1 Jan. 11, 2024

(51) Int. Cl.
*H04W 52/24* (2009.01)
*H04W 52/36* (2009.01)

(52) U.S. Cl.
CPC ....... *H04W 52/241* (2013.01); *H04W 52/367* (2013.01)

(58) Field of Classification Search
CPC . H04W 52/241; H04W 52/367; H04W 52/42; H04W 52/146; H04W 52/365
See application file for complete search history.

(56) References Cited

U.S. PATENT DOCUMENTS

| | | | |
|---|---|---|---|
| 12,149,467 B2 * | 11/2024 | Cirik | H04L 5/0048 |
| 12,446,058 B2 * | 10/2025 | Farag | H04W 72/046 |
| 2019/0261289 A1 | 8/2019 | Raghavan et al. | |
| 2024/0023033 A1 * | 1/2024 | Caporal Del Barrio | H04W 52/146 |
| 2024/0259053 A1 * | 8/2024 | Canonne-Velasquez | H04B 7/022 |

FOREIGN PATENT DOCUMENTS

| | | |
|---|---|---|
| CN | 110536397 A | 12/2019 |
| CN | 111436105 A | 7/2020 |
| CN | 112106411 A | 12/2020 |
| EP | 3541111 A1 | 9/2019 |

(Continued)

OTHER PUBLICATIONS

International Search Report and Written Opinion—PCT/CN2021/072179—ISA/EPO—Oct. 19, 2021.

(Continued)

*Primary Examiner* — Fayyaz Alam
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, a channel state information (CSI) reporting configuration. The UE may transmit, to the base station, a CSI report according to the CSI reporting configuration, the CSI report including a maximum permissible exposure report. Numerous other aspects are described.

28 Claims, 9 Drawing Sheets

(56)　　　　　　　References Cited

FOREIGN PATENT DOCUMENTS

| WO | 2018142380 | A1 | 8/2018 |
|----|------------|----|--------|
| WO | 2020237619 | A1 | 12/2020 |
| WO | 2020259852 | A1 | 12/2020 |
| WO | 2022151130 |    | 7/2022 |

OTHER PUBLICATIONS

Nokia, et al., "Miscellaneous Correction on MPE Reporting to 38.321", 3GPP Draft, 3GPP TSG-RAN#90e, RP-202695, Electronic Meeting, Dec. 7-11, 2020, 9 Pages.

3GPP TS 38.214: "3rd Generation Partnership Project, Technical Specification Group Radio Access Network, NR, Physical Layer Procedures for Data (Release 16)", Draft38214-G40, V16.4.0, (Dec. 2020), 3GPP, Mobile Competence Centre, 650, Route Des Lucioles, F-06921 Sophia-Antipolis Cedex, France, vol. RAN WG1, No. V16.4.0, Jan. 8, 2021, XP051999688, pp. 1-169, The Whole Document.

3GPP TS 38.331: "3rd Generation Partnership Project, Technical Specification Group Radio Access Network, NR, Radio Resource Control (RRC) Protocol Specification (Release 16)", 3GPP Standard, Technical Specification, 3GPP, Mobile Competence Centre, 650, Route Des Lucioles, F-06921, Sophia-Antipolis Cedex, France, vol. RAN WG2, No. V16.3.1, Jan. 7, 2021, XP051999705, pp. 1-932, The Whole Document.

Supplementary European Search Report—EP21918562—Search Authority—The Hague—Sep. 9, 2024.

\* cited by examiner

110

120

410

420
Cluster 1
(DL beam stronger,
UL beam not permitted
due to MPE)

430
Cluster 2
(DL beam weaker,
UL beam permitted)

400

610  Receive, from a base station, a CSI reporting configuration

620  Transmit, to the base station, a CSI report according to the CSI reporting configuration, the CSI report including an MPE report

600

710  Transmit, to a UE, a CSI reporting configuration

720  Receive, from the UE, a CSI report according to the CSI reporting configuration, the CSI report including an MPE report

700

MAXIMUM PERMISSIBLE EXPOSURE REPORTING

CROSS-REFERENCE TO RELATED APPLICATION

This Patent Application is a 371 national stage of PCT Application No. PCT/CN2021/072179 filed on Jan. 15, 2021, entitled "MAXIMUM PERMISSIBLE EXPOSURE REPORTING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for maximum permissible exposure (MPE) reporting.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory and one or more processors operatively coupled to the memory, the memory and the one or more processors configured to: receive, from a base station, a channel state information (CSI) reporting configuration; and transmit, to the base station, a CSI report according to the CSI reporting configuration, the CSI report including a maximum permissible exposure (MPE) report.

In some aspects, a base station for wireless communication includes a memory and one or more processors operatively coupled to the memory, the memory and the one or more processors configured to: transmit, to a UE, a CSI reporting configuration; and receive, from the UE, a CSI report according to the CSI reporting configuration, the CSI report including an MPE report.

In some aspects, a method of wireless communication performed by a UE includes receiving, from a base station, a CSI reporting configuration; and transmitting, to the base station, a CSI report according to the CSI reporting configuration, the CSI report including an MPE report.

In some aspects, a method of wireless communication performed by a base station includes transmitting, to a UE, a CSI reporting configuration; and receiving, from the UE, a CSI report according to the CSI reporting configuration, the CSI report including an MPE report.

In some aspects, an apparatus for wireless communication includes means for receiving, from a base station, a CSI reporting configuration; and means for transmitting, to the base station, a CSI report according to the CSI reporting configuration, the CSI report including an MPE report.

In some aspects, an apparatus for wireless communication includes means for transmitting, to a UE, a CSI reporting configuration; and means for receiving, from the UE, a CSI report according to the CSI reporting configuration, the CSI report including an MPE report.

In some aspects, a non-transitory computer-readable medium storing a set of instructions for wireless communication includes one or more instructions that, when executed by one or more processors of a UE, cause the UE to: receive, from a base station, a CSI reporting configuration; and transmit, to the base station, a CSI report according to the CSI reporting configuration, the CSI report including an MPE report.

In some aspects, a non-transitory computer-readable medium storing a set of instructions for wireless communication includes one or more instructions that, when executed by one or more processors of a base station, cause the base station to: transmit, to a UE, a CSI reporting configuration; and receive, from the UE, a CSI report according to the CSI reporting configuration, the CSI report including an MPE report.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

Figure 1:
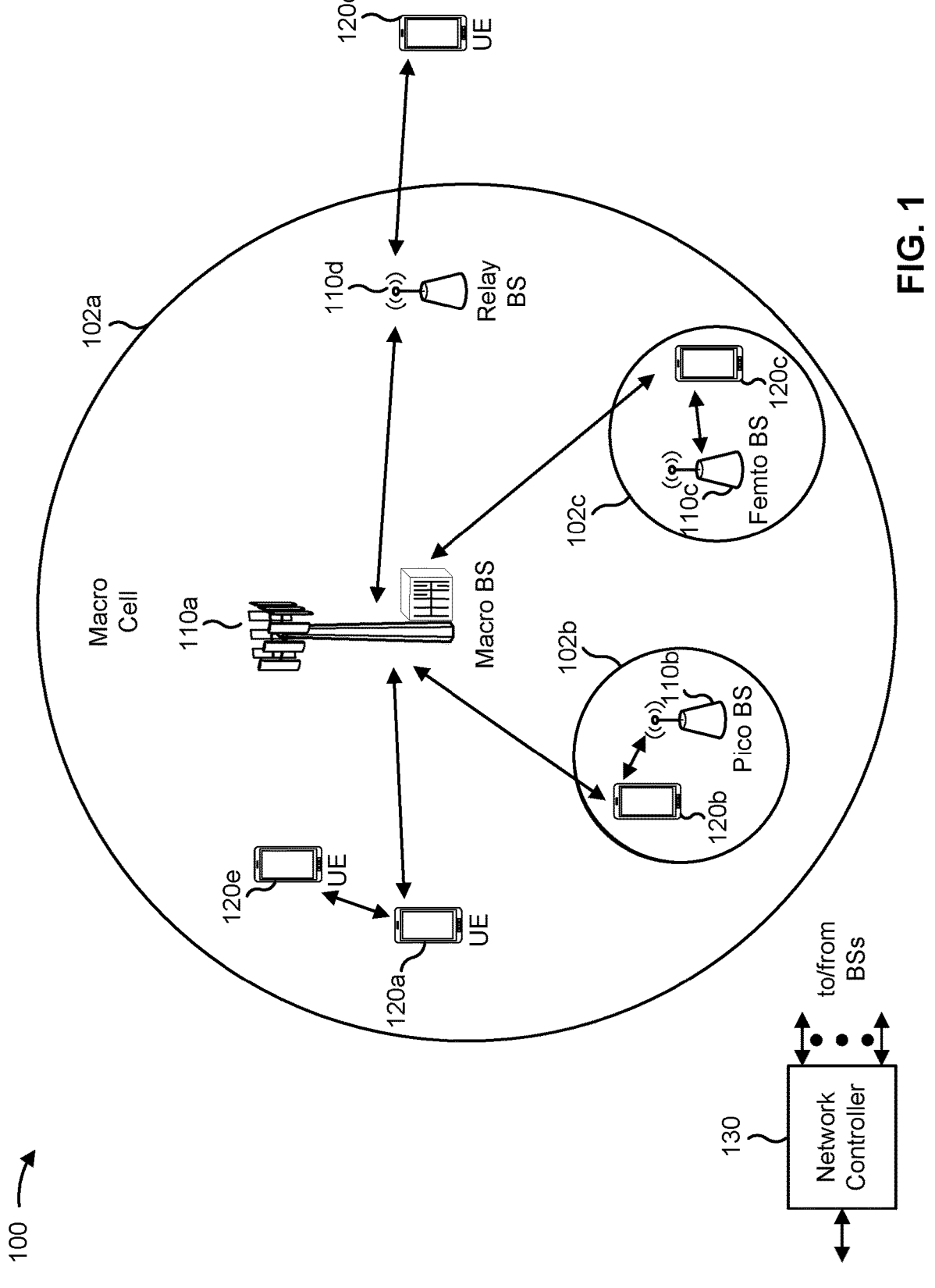
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular radio access technology (RAT) and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
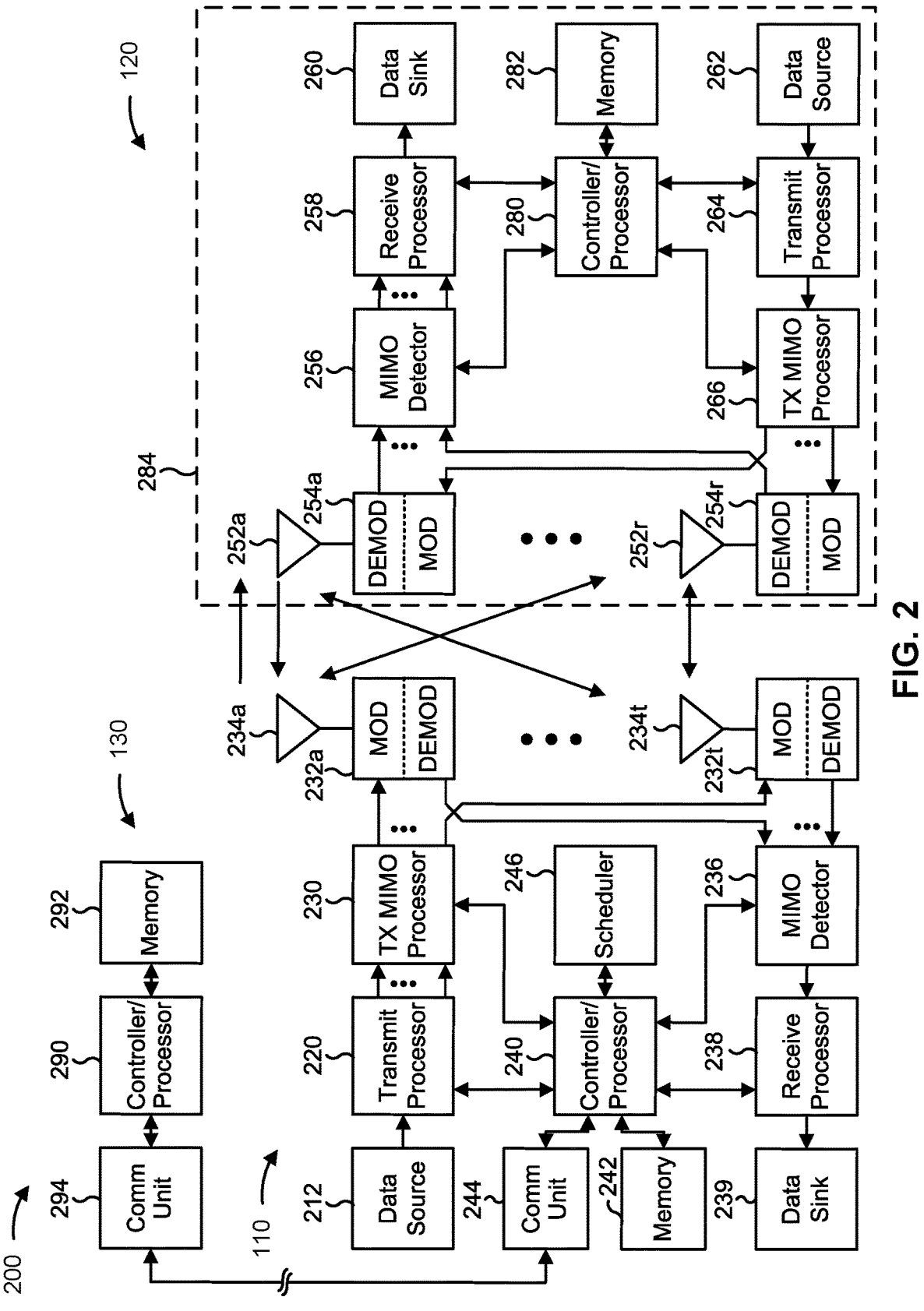
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 5-7.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 5-7.

Controller/processor 240 of base station 110, controller/processor 280 of UE 120, and/or any other component(s) of FIG. 2 may perform one or more techniques associated with maximum permissible exposure (MPE) reporting, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, the UE includes means for receiving, from a base station, a channel state information (CSI) reporting configuration; and/or means for transmitting, to the base station, a CSI report according to the CSI reporting configuration, the CSI report including an MPE report. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for receiving information that identifies a mapping of a plurality of power management maximum power reduction value ranges to a plurality of reporting values. In some aspects, the UE includes means for determining measurements associated with one or more reference signals. In some aspects, the UE includes means for determining CSI feedback that is to be reported. In some aspects, the UE includes means for determining whether one or more beams are subject to an MPE constraint and/or determining an MPE value for one or more beams.

In some aspects, the base station includes means for transmitting, to a UE, a CSI reporting configuration; and/or means for receiving, from the UE, a CSI report according to the CSI reporting configuration, the CSI report including an MPE report. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station includes means for transmitting information that identifies a mapping of a plurality of power management maximum power reduction value ranges to a plurality of reporting values. In some aspects, the base station 110 includes means for determining the CSI reporting configuration. In some aspects, the base station 110 includes means for determining the mapping. In some aspects, the base station 110 includes means for determining one or more beams for the UE based at least in part on the CSI report that includes the MPE report.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
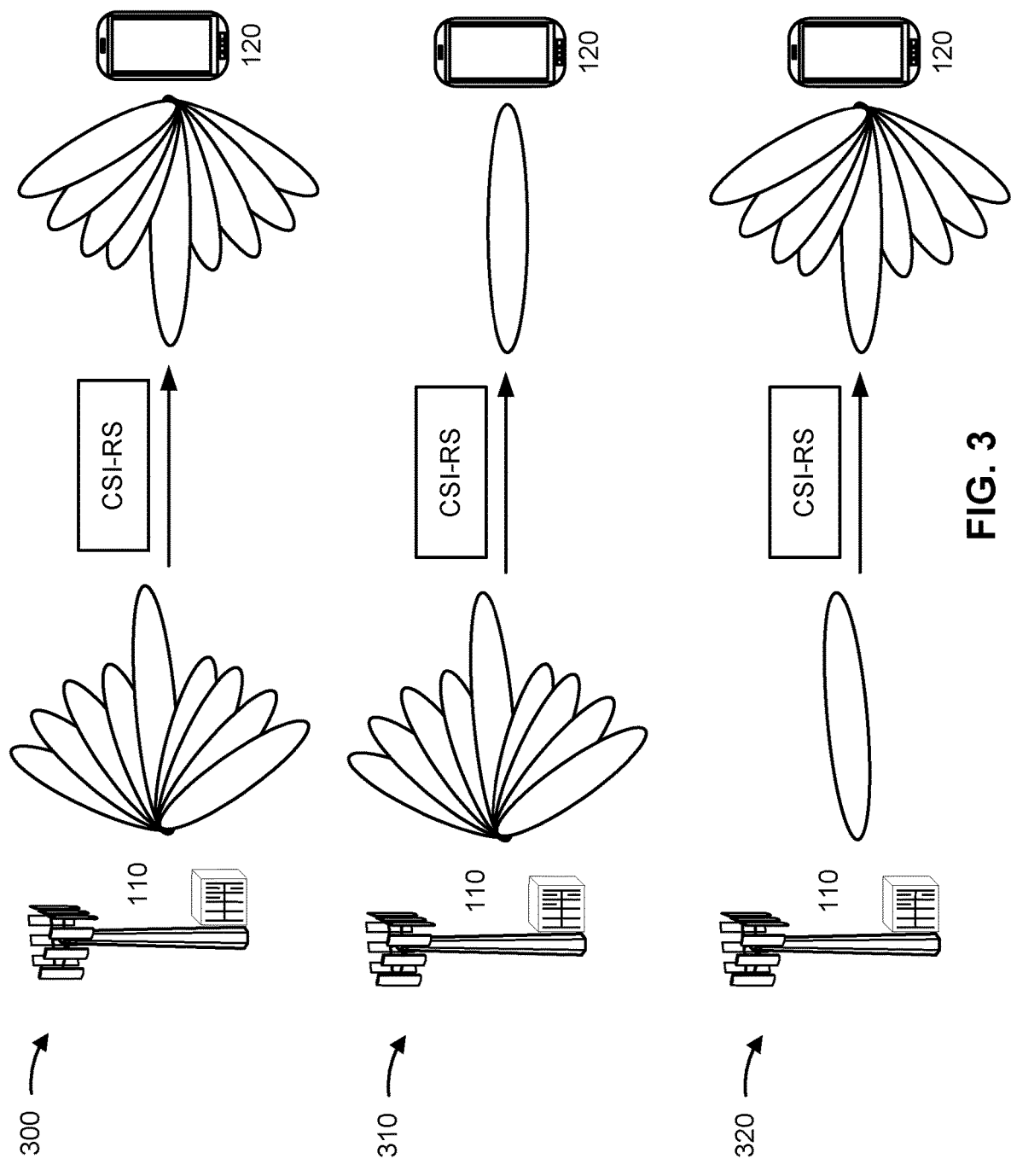
FIG. 3 is a diagram illustrating examples of channel state information reference signal beam management procedures, in accordance with various aspects of the present disclosure.

FIG. 3 is a diagram illustrating examples 300, 310, and 320 of CSI reference signal (CSI-RS) beam management procedures, in accordance with various aspects of the present disclosure. As shown in FIG. 3, examples 300, 310, and 320 include a UE 120 in communication with a base station 110 in a wireless network (e.g., wireless network 100). However, the devices shown in FIG. 3 are provided as examples, and the wireless network may support communication and beam management between other devices (e.g., between a UE 120 and a base station 110 or TRP, between a mobile termination node and a control node, between an integrated access and backhaul (IAB) child node and an IAB parent node, and/or between a scheduled node and a scheduling node). In some aspects, the UE 120 and the base station 110 may be in a connected state (e.g., a radio resource control (RRC) connected state).

As shown in FIG. 3, example 300 may include a base station 110 and a UE 120 communicating to perform beam management using CSI-RSs. Example 300 depicts a first beam management procedure (e.g., P1 CSI-RS beam management). The first beam management procedure may be referred to as a beam selection procedure, an initial beam acquisition procedure, a beam sweeping procedure, a cell search procedure, and/or a beam search procedure. As shown in FIG. 3 and example 300, CSI-RSs may be configured to be transmitted from the base station 110 to the UE 120. The CSI-RSs may be configured to be periodic (e.g., using RRC signaling), semi-persistent (e.g., using media access control (MAC) control element (MAC-CE) signaling), and/or aperiodic (e.g., using downlink control information (DCI)).

The first beam management procedure may include the base station 110 performing beam sweeping over multiple transmit (Tx) beams. The base station 110 may transmit a CSI-RS using each transmit beam for beam management. To enable the UE 120 to perform receive (Rx) beam sweeping, the base station may use a transmit beam to transmit (e.g., with repetitions) each CSI-RS at multiple times within the same reference signal resource set so that the UE 120 can sweep through receive beams in multiple transmission instances. For example, if the base station 110 has a set of N transmit beams and the UE 120 has a set of M receive beams, the CSI-RS may be transmitted on each of the N transmit beams M times so that the UE 120 may receive M instances of the CSI-RS per transmit beam. In other words, for each transmit beam of the base station 110, the UE 120 may perform beam sweeping through the receive beams of the UE 120. As a result, the first beam management procedure may enable the UE 120 to measure a CSI-RS on different transmit beams using different receive beams to support selection of base station 110 transmit beams/UE 120 receive beam(s) beam pair(s). The UE 120 may report (e.g., in a CSI report) the measurements to the base station 110 to enable the base station 110 to select one or more beam pair(s) for communication between the base station 110 and the UE 120. While example 300 has been described in connection with CSI-RSs, the first beam management process may also use synchronization signal blocks (SSBs) for beam management in a similar manner as described above.

As shown in FIG. 3, example 310 may include a base station 110 and a UE 120 communicating to perform beam management using CSI-RSs. Example 310 depicts a second beam management procedure (e.g., P2 CSI-RS beam management). The second beam management procedure may be referred to as a beam refinement procedure, a base station beam refinement procedure, a TRP beam refinement procedure, and/or a transmit beam refinement procedure. As shown in FIG. 3 and example 310, CSI-RSs may be configured to be transmitted from the base station 110 to the UE 120. The CSI-RSs may be configured to be aperiodic (e.g., using DCI). The second beam management procedure may include the base station 110 performing beam sweeping over one or more transmit beams. The one or more transmit beams may be a subset of all transmit beams associated with the base station 110 (e.g., determined based at least in part on measurements reported by the UE 120 in connection with the first beam management procedure). The base station 110 may transmit a CSI-RS using each transmit beam of the one or more transmit beams for beam management. The UE 120 may measure each CSI-RS using a single (e.g., a same) receive beam (e.g., determined based at least in part on measurements performed in connection with the first beam management procedure). The second beam management procedure may enable the base station 110 to select a best transmit beam based at least in part on measurements of the CSI-RSs (e.g., measured by the UE 120 using the single receive beam) reported by the UE 120.

As shown in FIG. 3, example 320 depicts a third beam management procedure (e.g., P3 CSI-RS beam management). The third beam management procedure may be referred to as a beam refinement procedure, a UE beam refinement procedure, and/or a receive beam refinement procedure. As shown in FIG. 3 and example 320, one or more CSI-RSs may be configured to be transmitted from the base station 110 to the UE 120. The CSI-RSs may be configured to be aperiodic (e.g., using DCI). The third beam management process may include the base station 110 transmitting the one or more CSI-RSs using a single transmit beam (e.g., determined based at least in part on measurements reported by the UE 120 in connection with the first beam management procedure and/or the second beam management procedure). To enable the UE 120 to perform receive beam sweeping, the base station may use a transmit beam to transmit (e.g., with repetitions) CSI-RS at multiple times within the same reference signal resource set so that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the base station 110 and/or the UE 120 to select a best receive beam based at least in part on reported measurements received from the UE 120 (e.g., of the CSI-RS of the transmit beam using the one or more receive beams).

As indicated above, FIG. 3 is provided as an example of beam management procedures. Other examples of beam management procedures may differ from what is described with respect to FIG. 3. For example, the UE 120 and the base station 110 may perform the third beam management procedure before performing the second beam management procedure, and/or the UE 120 and the base station 110 may perform a similar beam management procedure to select a UE transmit beam.

Figure 4:
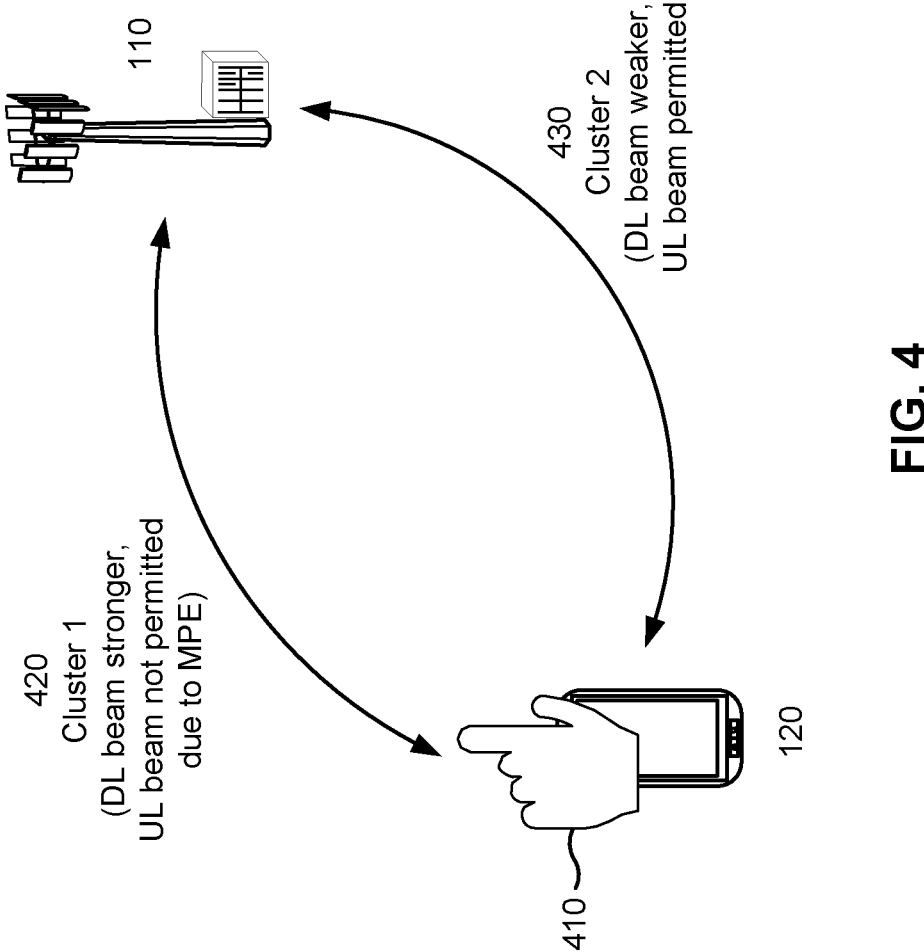
FIG. 4 is a diagram illustrating an example relating to maximum permissible exposure (MPE) constraints, in accordance with various aspects of the present disclosure.

FIG. 4 is a diagram illustrating an example 400 relating to maximum permissible exposure constraints, in accordance with various aspects of the present disclosure.

As shown in FIG. 4, a UE 120 and a base station 110 may be capable of communicating via one or more beams, and a communication via a beam may take multiple different paths, shown as a cluster of paths, to reach a receiver. In some cases, a beam may be a millimeter wave (mmWave) beam that carries a communication in the mmWave frequency band. When transmitting in the mmWave frequency band, a transmitter may use a higher antenna gain as compared to transmitting in the sub-6 GHz frequency band. As a result, the effective isotropic radiated power (EIRP), which represents the radiated power in a particular direction (e.g., the direction of the beam), may be higher for mmWave communications as compared to sub-6 GHz communications. To improve safety, some governing bodies have placed restrictions on the peak EIRP that can be directed toward the human body. These restrictions are sometimes referred to as MPE limitations and/or MPE constraints.

As shown by reference number 410, an MPE condition may be due to a hand blocking scenario, where a hand of a user of the UE 120 blocks or obstructs communications to and/or from an antenna subarray of the UE 120, or is otherwise positioned near the antenna subarray. Additionally, or alternatively, the MPE condition may be due to the position of another body part of the user, such as the user's face, head, ear, and/or leg, among other examples. When the UE 120 is subject to an MPE condition, a downlink beam of a first cluster 420 may be suitable for use by the UE 120 to communicate with the base station, but an uplink beam of the first cluster 420 may not be permitted for use due to the MPE condition.

An uplink beam and a downlink beam in the same cluster (e.g., the first cluster 420) may form a reciprocal beam pair, where the uplink beam is used for transmission at the UE 120 and reception at the base station, and the downlink beam is used for transmission at the base station and reception at the UE 120. In a reciprocal beam pair, the uplink beam and the downlink beam may be in the same direction or path (e.g., with energy radiating in a particular direction or path more than other directions or paths), but communications on the uplink beam may propagate in the opposite direction as communications on the downlink beam. Further, electrical characteristics of an antenna used to transmit and receive communications via a reciprocal beam pair may be the same, such as gain, radiation pattern, impedance, bandwidth, resonant frequency, and/or polarization, among other examples, regardless of whether the antenna is transmitting or receiving, due to the reciprocity theorem of electromagnetics. As used herein, "reciprocal beam pair" may refer to a beam pair having beam correspondence. Similarly, "non-reciprocal beam pair" may refer to a beam pair that does not have beam correspondence.

As indicated above, when the UE 120 is subject to an MPE condition, a downlink beam of a reciprocal beam pair may be suitable for use by the UE 120 to receive communications from the base station 110, and may have better beam conditions (e.g., a stronger beam) as compared to other downlink beams (e.g., in a different or distinct beam pair), but an uplink beam of the reciprocal beam pair may not be permitted for transmission of communications by the UE 120 due to the MPE condition. For example, the downlink beam may not be subject to an MPE constraint because an EIRP level of a transmission by the base station 110 may subside by the time the transmission reaches the UE 120 and/or the user's hand or other body part. However, the uplink beam may be subject to an MPE constraint because an EIRP level of a transmission by the UE 120 may exceed a permitted EIRP level due to the close proximity of the UE 120 and the user's hand or other body part. This is shown by the first cluster 420.

In such a case, it may be beneficial for the UE 120 and/or the base station 110 to use a first beam for uplink communications and a second beam for downlink communications, where the first beam (e.g., a UE uplink beam or a BS uplink beam) does not form a reciprocal beam pair with the second beam (e.g., a UE downlink beam or a BS downlink beam). In other words, the first beam and the second beam may be included in distinct beam pairs (i.e., different beam pairs). In some aspects, the UE 120 may select non-reciprocal (e.g., distinct or different) UE beams to communicate with the base station 110 even if the base station 110 is using reciprocal BS beams to communicate with the UE 120. For example, the UE uplink beam may be included in a second cluster 430 and the UE downlink beam may be included in the first cluster 420 (e.g., even if the base station 110 is using a BS uplink beam and a BS downlink beam that are both included in the first cluster 420). The UE uplink beam may form a reciprocal beam pair with a UE downlink beam in the second cluster 430 that is weaker than and/or has less suitable beam conditions than the UE downlink beam in the first cluster 420. By choosing distinct UE uplink and UE downlink beams (e.g., a UE uplink beam and a UE downlink beam from different beam pairs), the UE 120 may improve performance while satisfying an MPE constraint.

Additionally, or alternatively, the base station 110 may select non-reciprocal BS beams, such that a UE uplink beam, used to transmit communications to the base station 110 (e.g., and received at the base station via a BS uplink beam), has a reduced MPE impact at the UE 120 as compared to a BS uplink beam that forms a reciprocal beam pair with the BS downlink beam that has the best or better performance. In some aspects, the UE 120 may report different metrics to facilitate the selection of the BS uplink beam and/or the BS downlink beam, as described above.

As indicated above, FIG. 4 is provided as an example. Other examples may differ from what is described in connection with FIG. 4.

In some wireless networks, a UE may be configured to transmit one or more CSI reports (which may also be referred to as CSI feedback). CSI measurement and reporting may be based at least in part on a CSI reporting configuration. A CSI reporting configuration may be semi-statically configured (e.g., using RRC signaling). The CSI reporting configuration may identify a periodicity for CSI reporting, a reference signal for CSI reporting, and/or a resource associated with CSI reporting, among other examples. CSI reporting can be performed periodically, semi-persistently, or aperiodically. Aperiodic CSI reporting can be triggered, whereas periodic and semi-persistent CSI reporting can be configured to be performed in accordance with an interval.

As described above, the base station may transmit CSI-RSs and/or SSBs on a plurality of beams. The UE may measure the beams and report, to the base station and according to the CSI reporting configuration, channel information and/or interference information. For example, the UE may report CSI-RS resource indicators (CRIs) or SSB resource indicators (SSBRIs) in a CSI report. The CSI report may also include an associated report quantity. For example, the report quantity may be based at least in part on a Layer 1 (L1) measurement, such as an L1 RSRP or an L1 signal to interference plus noise ratio (SINR). L1-RSRP and/or L1-SINR may be used for beam selection, as described above.

In some examples, to facilitate inter-TRP beam pairing, the UE may perform beam measurement and reporting according to a down-selection of a CSI reporting alternative. In a first alternative, in a CSI report, the UE may report on multiple groups (e.g., pairs) of beams (N, where N>1), and each group may include one or more beams (M, where M≥1, and where M may have the same value across different groups or M may have different values across different groups). Here, the UE can receive different beams in different groups simultaneously. In a second alternative, in a CSI report, the UE may report on one or more groups of beams (N, where N≥1), and each group may include multiple beams (M, where M>1). Here, the UE can receive different beams within a group simultaneously. In a third alternative, the UE may report on one or more beams (M, where M≥1) in multiple CSI reports (N, where N>1, corresponding to N report settings). Here, the UE can receive different beams in different CSI reports simultaneously. In some cases, the UE may receive an indication (e.g., in the CSI reports) that the different CSI reports are associated with each other. Additionally, the UE may provide an indication that differentiates reported measurements for beams that are received simultaneously and reported measurements for beams that are not received simultaneously. Similarly, the UE may provide an indication with the CSI reports to indicate whether beams in different CSI reports can be received simultaneously.

In some examples, the UE may transmit a report for use in MPE mitigation. For example, the UE may report a power management maximum power reduction (P-MPR), as defined in 3GPP Release 16. The P-MPR report may be at a beam level or at an antenna panel level. Moreover, the maximum quantity of panels for a P-MPR report may be a single panel or multiple panels. In some examples, the UE may report an SSBRI, a CRI, and/or a panel selection indication (e.g., explicitly or implicitly) to thereby indicate an alternative UE antenna panel and/or transmit beam for an uplink transmission, and/or to indicate a feasible UE antenna panel and/or transmit beam, taking an MPE condition into account, for an uplink transmission. However, signaling for the MPE reporting, in addition to the signaling for CSI reporting described above, may result in significant overhead.

Some techniques and apparatuses described herein provide for MPE reporting in a CSI report (e.g., a beam report). For example, additional bits for MPE reporting may be appended to a CSI report. In some aspects, the MPE report may be at a beam level (i.e., per beam) or at an antenna panel level (i.e., per panel). For example, the MPE report may include MPE reporting for each reported beam of the CSI report or for each reported panel of the CSI report. The MPE report may include a quantized MPE value for a beam or a panel. For example, the quantized MPE value may indicate whether a beam or a panel is subject to an MPE constraint and/or may indicate a level of MPE associated with a beam or a panel.

The base station may use the information contained in the MPE report to dynamically adapt scheduling for the UE to help the UE maintain the uplink connection and/or to satisfy MPE limits. For example, the base station may schedule the UE to use a particular beam, to transmit less or more often, and/or to reduce or increase uplink transmit power. In this way, by providing an MPE report to the base station that indicates whether beams or panels are subject to an MPE constraint, the base station may schedule the UE more efficiently, which improves performance of the UE and conserves network resources that may otherwise be used for reestablishing dropped connections, retransmissions, or the like.

Figure 5:
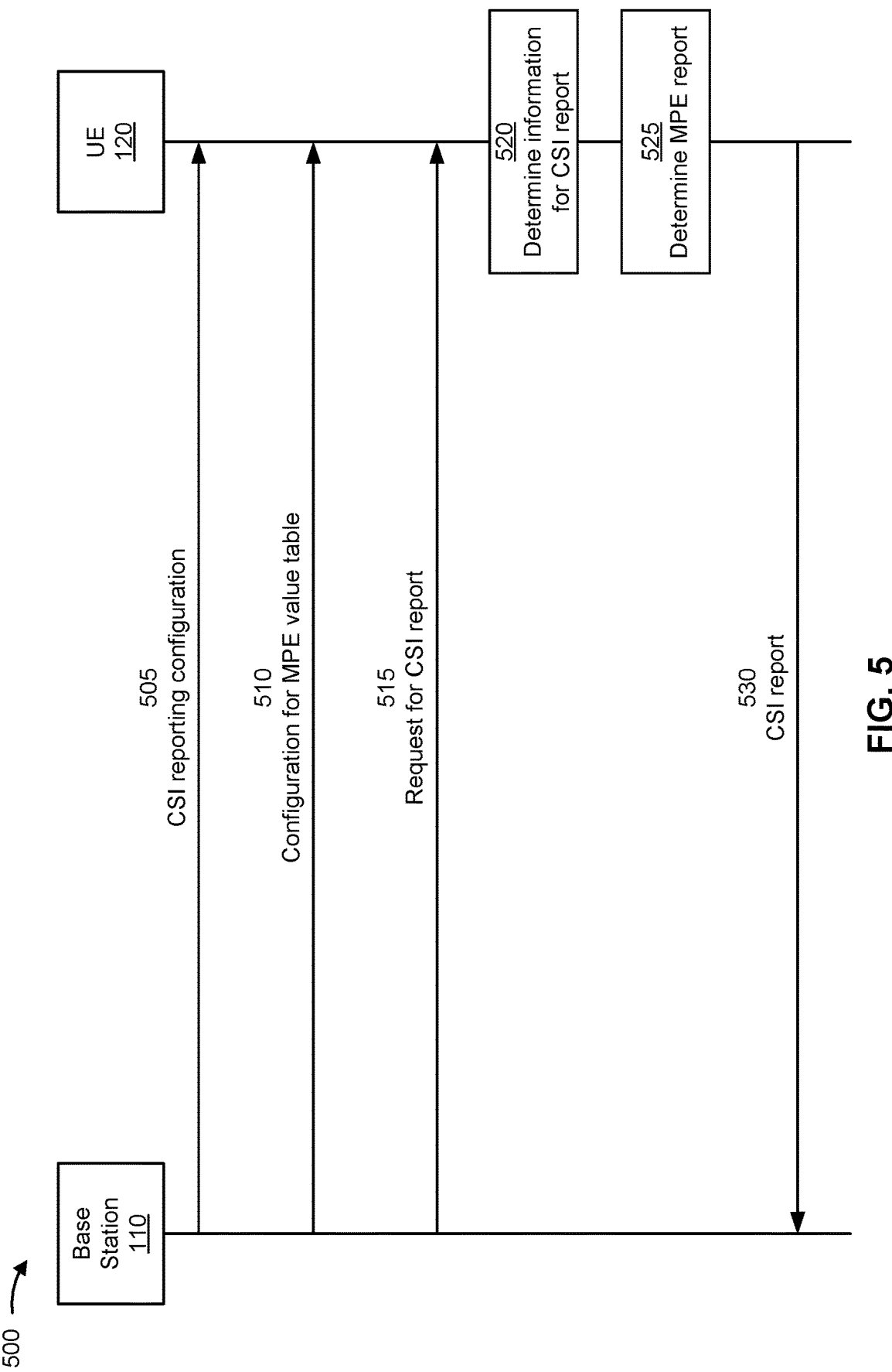
FIG. 5 is a diagram illustrating an example associated with MPE reporting, in accordance with various aspects of the present disclosure.

FIG. 5 is a diagram illustrating an example 500 associated with MPE reporting, in accordance with various aspects of the present disclosure. As shown in FIG. 5, example 500 includes communication between a base station 110 and a UE 120. In some aspects, the base station 110 and the UE 120 may be included in a wireless network, such as the wireless network 100. The base station 110 and the UE 120 may communicate via a wireless access link, which may include an uplink and a downlink.

As shown by reference number 505, the base station 110 may transmit, and the UE 120 may receive, a CSI reporting configuration. The CSI reporting configuration may be for one or more CSI reports (e.g., beam reports). The CSI reporting configuration may be included in an RRC message, such as an RRC configuration message and/or an RRC reconfiguration message, among other examples. In some aspects, the CSI reporting configuration may identify a report setting (e.g., aperiodic, semi-persistent, or periodic) for a CSI report. In some aspects, a CSI reporting configuration may identify a report quantity that indicates the quantities or parameters that are to be reported in a CSI report. For example, the report quantity may indicate that an L1-RSRP and/or an L1-SINR parameter is to be included in a CSI report. Additionally, or alternatively, the report quantity may indicate one or more other parameters that are to be reported in the CSI report, such as a CQI parameter, a precoding matrix indicator (PMI) parameter, a CRI parameter, a strongest layer indicator (SLI) parameter, and/or a rank indicator (RI) parameter, among other examples. In some aspects, the reporting configuration may include an indication of whether the UE is to include an MPE report in a CSI report (e.g., the CSI reporting configuration may include an "MPE indicator").

As shown by reference number 510, the base station 110 may transmit, and the UE 120 may receive, a configuration for an MPE value table. The MPE value table may enable the UE 120 to report an MPE value (e.g., a quantized MPE value) in an MPE report. For example, the configuration may include information that identifies a mapping of a plurality of MPE value ranges to a plurality of reporting values. The plurality of MPE value ranges may be a plurality of P-MPR ranges, or ranges of another parameter associated with MPE. In some aspects, the UE 120 may be provisioned with the MPE value table (e.g., the MPE value table may be fixed at the UE 120).

In some aspects, the MPE value table may be for 1-bit MPE reporting. Here, the mapping may identify respective reporting values for two ranges of MPE values (e.g., P-MPR values). For example, the mapping may identify a first reporting value (e.g., 0) for use when an MPE value (e.g., a P-MPR value) is greater than a first threshold value (e.g., MPE value>threshold 0); and a second reporting value (e.g., 1) for use when an MPE value (e.g., a P-MPR value) is greater than a second threshold value (e.g., MPE value>threshold 1) and less than the first threshold value (e.g., MPE value<threshold 0).

In some aspects, the MPE value table may be for 2-bit MPE reporting. Here, the mapping may identify respective reporting values for four ranges of MPE values (e.g., P-MPR values). For example, the mapping may identify a first reporting value (e.g., 00) for use when an MPE value (e.g., a P-MPR value) is greater than a first threshold value (e.g., MPE value>threshold 0); a second reporting value (e.g., 01) for use when an MPE value (e.g., a P-MPR value) is greater than a second threshold value (e.g., MPE value>threshold 1) and less than the first threshold value (e.g., MPE value<threshold 0); a third reporting value (e.g., 10) for use when an MPE value (e.g., a P-MPR value) is greater than a third threshold value (e.g., MPE value>threshold 2) and less than the second threshold value (e.g., MPE value<threshold 1); and a fourth reporting value (e.g., 11) for use when an MPE value (e.g., a P-MPR value) is greater than a fourth threshold value (e.g., MPE value>threshold 3) and less than the third threshold value (e.g., MPE value<threshold 2).

As shown by reference number 515, the base station 110 may transmit, and the UE 120 may receive, a request for a CSI report (sometimes referred to as a CSI request). In some aspects, the request is a request for a periodic CSI report. In such cases, the base station 110 may indicate a periodicity and/or a set of uplink resources for transmission of the CSI report, a periodicity and/or a set of downlink resources for reference signals (e.g., CSI-RSs or SSBs) to be measured by the UE 120 for the CSI report, or the like. In some aspects, the request is a request for aperiodic CSI. In such cases, the base station 110 may indicate a set of uplink resources for transmission of the CSI report, a set of downlink resources for reference signals (e.g., CSI-RSs or SSBs) to be measured by the UE 120 for the CSI report, or the like. In some aspects, the request may be included in an RRC message, such as the same RRC message that includes the CSI reporting configuration. Additionally, or alternatively, the request may be included in DCI and/or a MAC-CE, among other examples.

As shown by reference number 520, the UE 120 may determine information (e.g., CSI feedback) for the CSI report. For example, the UE 120 may perform measurements of one or more reference signals, as described above, in order to determine the information for the CSI report. In some aspects, the UE 120 may determine one or more reference signal resource indicators (e.g., CRIs and/or SSBRIs) for the CSI report. A reference signal resource indicator may be a beam indicator that indicates a receive beam of the UE (e.g., used to receive the reference signal). In some aspects, the UE 120 may determine one or more L1 measurements (e.g., L1-RSRP or L1-SINR) for the CSI report. For example, an L1 measurement may correspond to a reference signal received by the UE 120.

As shown by reference number 525, the UE 120 may determine an MPE report for the CSI report. For example, for each reported reference signal (e.g., identified by a CRI or an SSBRI) of the CSI report, the UE 120 may determine an MPE condition associated with the reference signal (e.g., if the CRI or the SSBRI were applied to an uplink transmission of the UE 120). Accordingly, the UE 120 may determine MPE reporting values for one or more reference signals (e.g., identifying beams) identified by the CSI report or for one or more sets of reference signals (e.g., identifying panels) identified by the CSI report. For example, an MPE reporting value may be a first value to indicate that a beam or a panel is subject to an MPE constraint or a second value to indicate that a beam or a panel is not subject to an MPE constraint. As another example, an MPE reporting value may be based at least in part on the MPE value table described above.

As shown by reference number 530, the UE 120 may transmit, and the base station 110 may receive, the CSI report (e.g., the beam report). The CSI report may be for L1-RSRP reporting or L1-SINR reporting. The CSI report may include the MPE report (e.g., appended to the CSI report). For example, one or more additional bits may be appended to the CSI report for the MPE report. The MPE report may include per-beam MPE indications or per-panel MPE indications, as described below.

In some aspects, the MPE report may include an indication (e.g., an MPE reporting value) of whether a reference signal (e.g., a reference signal index) identified by the CSI report (e.g., by a CRI and/or an SSBRI) is associated with an MPE constraint (e.g., suffering MPE or not suffering MPE). That is, the indication may indicate whether a beam (e.g., identified by the reference signal index) is subject to an MPE constraint (e.g., if the beam were to be used for an uplink transmission). In some aspects, the indication may indicate an MPE value (e.g., a P-MPR value) associated with a reference signal (e.g., identifying a beam) identified by the CSI report (e.g., according to the MPE value table, as described above). The MPE report may include respective MPE indications (e.g., per-beam indications) for each reference signal (e.g., each reference signal index) identified by the CSI report. That is, one or more (e.g., two) additional bits may be appended to the CSI report for each MPE indication of the MPE report.

As an example, the CSI fields of the CSI report may include: a first CRI or SSBRI, if reported; a second CRI or SSBRI, if reported; a third CRI or SSBRI, if reported; and/or a fourth CRI or SSBRI, if reported. In addition, the CSI fields may include: a first RSRP or SINR (e.g., associated with the first CRI or SSBRI), if reported; a second RSRP or SINR (e.g., associated with the second CRI or SSBRI), if reported, which may be a differential value from the first RSRP or SINR; a third RSRP or SINR (e.g., associated with the third CRI or SSBRI), if reported, which may be a differential value from the first RSRP or SINR; and/or a fourth RSRP or SINR (e.g., associated with the fourth CRI or SSBRI), if reported, which may be a differential value from the first RSRP or SINR. Furthermore, the CSI fields may include a first MPE indicator (e.g., associated with the first CRI or SSBRI), if reported; a second MPE indicator (e.g., associated with the second CRI or SSBRI), if reported; a third MPE indicator (e.g., associated with the third CRI or SSBRI), if reported; and/or a fourth MPE indicator (e.g., associated with the fourth CRI or SSBRI), if reported.

In some aspects, the MPE report may include an indication (e.g., an MPE reporting value) of whether a set of reference signals (e.g., a set of reference signal indices) identified by the CSI report (e.g., by CRIs and/or SSBRIs) is associated with an MPE constraint. That is, the indication may indicate whether a panel (e.g., identified by the set of reference signal indices) is subject to an MPE constraint (e.g., if the panel were to be used for an uplink transmission). In some aspects, the indication may indicate an MPE value (e.g., a P-MPR value) associated with a set of reference signals (e.g., identifying a panel) identified by the CSI report (e.g., according to the MPE value table, as described above). The MPE report may include respective MPE indications (e.g., per-panel indications) for each set of reference signals (e.g., each set of reference signal indices) identified by the CSI report. That is, one or more (e.g., two) additional bits may be appended to the CSI report for each MPE indication of the MPE report. In some aspects, a panel-level MPE indication may provide a single MPE indication for the beams of an antenna panel of the UE 120. In some aspects, a panel-level MPE indication may provide respective MPE indications (e.g., differential MPE indications) for the beams of an antenna panel of the UE 120.

In some aspects, the CSI report may identify (e.g., for multi-TRP communication) multiple groups of reference signals (e.g., multiple groups of beams), and a group of reference signals may include one or more reference signals (e.g., one or more beams). For example, the UE 120 may be configured (e.g., by the CSI reporting configuration) to report, in the CSI report, N (N>1) groups of beams with M (M≥1) beams per group. Thus, a group of reference signals (e.g., a group of beams) may include a first reference signal (e.g., a first beam) and a second reference signal (e.g., a second beam), and/or a group of reference signals may include a single reference signal (e.g., a single beam).

In some aspects, the MPE report may include a first MPE indication (e.g., in one or more first additional bits to the CSI report) for a first set of reference signals (e.g., reference signal indices) identified by the CSI report, and a second MPE indication (e.g., in one or more second additional bits to the CSI report) for a second set of reference signals (e.g., reference signal indices) identified by the CSI report. The first set of reference signals may include first reference signals of the groups of reference signals having more than one reference signal (e.g., having two reference signals), and the second set of reference signals may include second reference signals of the groups of reference signals having more than one reference signal. In other words, the first MPE indication may be for a set of first reference signals in all N groups of reference signals, and the second MPE indication may be for a set of second reference signals in all N groups of reference signals. In this way, the first MPE indication may relate to a first panel of the UE 120 and the second MPE indication may relate to a second panel of the UE 120.

As described above, in some examples, a group of reference signals may include a single reference signal. Here, the first set of reference signals may further include reference signals of the groups of reference signals having only one reference signal. In other words, the first MPE indication may further be for reference signals in groups of reference signals having only one reference signal. In some aspects, the MPE report may further include a third indication (e.g., in one or more third additional bits to the CSI report) for a third set of reference signals identified by the CSI report. The third set of reference signals may include reference signals of the groups of reference signals having only one reference signal.

In some aspects, the CSI report may identify (e.g., for multi-TRP communication) one or more groups of reference signals (e.g., one or more groups of beams), and a group of reference signals may include multiple reference signals (e.g., multiple beams). For example, the UE 120 may be configured (e.g., by the CSI reporting configuration) to report, in the CSI report, N (N≥1) groups of beams with M (M>1) beams per group. Thus, each group of reference signals (e.g., each group of beams) may include a first reference signal (e.g., a first beam) and a second reference signal (e.g., a second beam).

In some aspects, the MPE report may include a first MPE indication (e.g., in one or more first additional bits to the CSI report) for a first set of reference signals (e.g., reference signal indices) identified by the CSI report, and a second MPE indication (e.g., in one or more second additional bits to the CSI report) for a second set of reference signals (e.g., reference signal indices) identified by the CSI report, in a similar manner as described above. For example, the first MPE indication may be for a set of first reference signals in all N groups of reference signals, and the second MPE indication may be for a set of second reference signals in all N groups of reference signals.

In some aspects, the CSI report may identify multiple reference signals, and the CSI report may correspond to a particular report setting (e.g., the CSI report corresponds to a panel). For example, the UE 120 may be configured (e.g., by the CSI reporting configuration) to report on M (M≥1) beams in N (N>1) CSI reports corresponding to N report settings. In some aspects, the CSI report (e.g., one of the N CSI reports) includes an MPE indication (e.g., in one or more additional bits to the CSI report) for the multiple reference signals identified by the CSI report. In other words, an MPE indication may be per CSI report. For example, the UE 120 may report nth additional bit(s) to provide the MPE indication for a set of reference signals in the nth CSI report.

As described above, the base station 110 may use the CSI report to select one or more beams that are to be used by the UE 120. For example, the base station 110 may select the one or more beams based at least in part on the MPE report of the CSI report. As an example, the base station 110 may select a beam that is not subject to an MPE constraint and/or select a beam that is associated with a threshold MPE value (e.g., a beam associated with a P-MPR value that is below a threshold value). In some aspects, the UE 120 and the base station 110 may communicate using the one or more beams selected by the base station 110. For example, the UE 120 may communicate with multiple TRPs using multiple beams (e.g., associated with different panels of the UE 120).

As indicated above, FIG. 5 is provided as an example. Other examples may differ from what is described with respect to FIG. 5.

Figure 6:
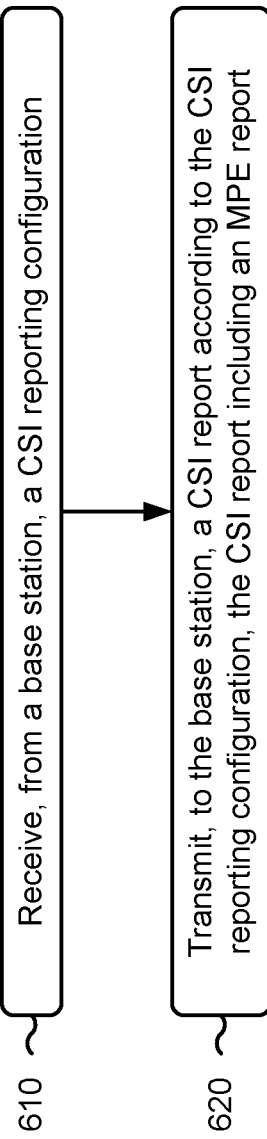
FIGS. 6-7 are diagrams illustrating example processes associated with MPE reporting, in accordance with various aspects of the present disclosure.

FIG. 6 is a diagram illustrating an example process 600 performed, for example, by a UE, in accordance with various aspects of the present disclosure. Example process 600 is an example where the UE (e.g., UE 120) performs operations associated with MPE reporting.

As shown in FIG. 6, in some aspects, process 600 may include receiving, from a base station, a CSI reporting configuration (block 610). For example, the UE (e.g., using reception component 802, depicted in FIG. 8) may receive, from a base station, a CSI reporting configuration, as described above.

As further shown in FIG. 6, in some aspects, process 600 may include transmitting, to the base station, a CSI report according to the CSI reporting configuration, the CSI report including an MPE report (block 620). For example, the UE (e.g., using transmission component 804, depicted in FIG. 8) may transmit, to the base station, a CSI report according to the CSI reporting configuration, the CSI report including an MPE report, as described above.

Process 600 may include additional aspects, such as any single aspect or any combination of aspects described below and/or in connection with one or more other processes described elsewhere herein.

In a first aspect, the CSI report is for L1-RSRP reporting or for L1-SINR reporting.

In a second aspect, alone or in combination with the first aspect, the MPE report includes an indication of whether a reference signal identified in the CSI report is associated with an MPE constraint.

In a third aspect, alone or in combination with one or more of the first and second aspects, the CSI reporting configuration includes an indication that the UE is to include the MPE report in the CSI report.

In a fourth aspect, alone or in combination with one or more of the first through third aspects, process 600 includes receiving information that identifies a mapping of a plurality of power management maximum power reduction value ranges to a plurality of reporting values.

In a fifth aspect, alone or in combination with one or more of the first through fourth aspects, the MPE report includes an indication of a P-MPR value associated with a reference signal identified in the CSI report.

In a sixth aspect, alone or in combination with one or more of the first through fifth aspects, the CSI report identifies multiple groups of reference signals, and a group of reference signals, of the multiple groups of reference signals, includes one or more reference signals.

In a seventh aspect, alone or in combination with one or more of the first through sixth aspects, the MPE report includes a first indication of whether a first set of reference signals, that includes first reference signals of the multiple groups of reference signals having more than one reference signal, is associated with an MPE constraint, and a second indication of whether a second set of reference signals, that includes second reference signals of the multiple groups of reference signals having more than one reference signal, is associated with an MPE constraint.

In an eighth aspect, alone or in combination with one or more of the first through seventh aspects, the first set of reference signals further includes reference signals of the multiple groups of reference signals having only one reference signal.

In a ninth aspect, alone or in combination with one or more of the first through eighth aspects, the MPE report further includes a third indication of whether a third set of reference signals, that includes reference signals of the multiple groups of reference signals having only one reference signal, is associated with an MPE constraint.

In a tenth aspect, alone or in combination with one or more of the first through ninth aspects, the CSI report identifies one or more groups of reference signals, and a group of reference signals, of the one or more groups of reference signals, includes multiple reference signals.

In an eleventh aspect, alone or in combination with one or more of the first through tenth aspects, the MPE report includes a first indication of whether a first set of reference signals, that includes first reference signals of the one or more groups of reference signals, is associated with an MPE constraint, and a second indication of whether a second set of reference signals, that includes second reference signals of the one or more groups of reference signals, is associated with an MPE constraint.

In a twelfth aspect, alone or in combination with one or more of the first through eleventh aspects, the CSI report identifies multiple reference signals, and the CSI report corresponds to a particular report setting.

In a thirteenth aspect, alone or in combination with one or more of the first through twelfth aspects, the MPE report includes an indication of whether the multiple reference signals are associated with an MPE constraint.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
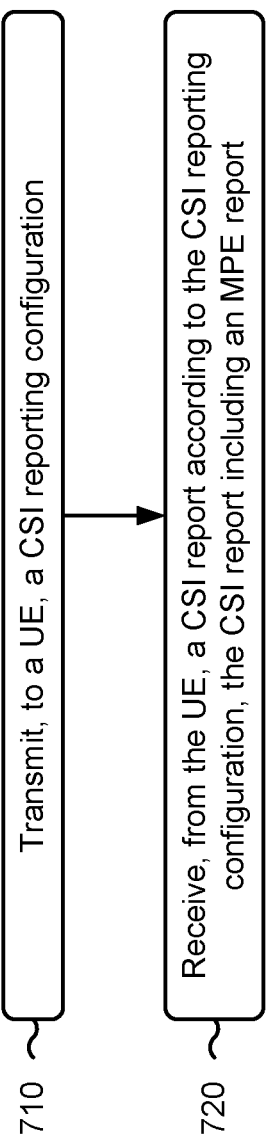

FIG. 7 is a diagram illustrating an example process 700 performed, for example, by a base station, in accordance with various aspects of the present disclosure. Example process 700 is an example where the base station (e.g., base station 110) performs operations associated with MPE reporting.

As shown in FIG. 7, in some aspects, process 700 may include transmitting, to a UE, a CSI reporting configuration (block 710). For example, the base station (e.g., using transmission component 904, depicted in FIG. 9) may transmit, to a UE, a CSI reporting configuration, as described above.

As further shown in FIG. 7, in some aspects, process 700 may include receiving, from the UE, a CSI report according to the CSI reporting configuration, the CSI report including an MPE report (block 720). For example, the base station (e.g., using reception component 902, depicted in FIG. 9) may receive, from the UE, a CSI report according to the CSI reporting configuration, the CSI report including an MPE report, as described above.

Process 700 may include additional aspects, such as any single aspect or any combination of aspects described below and/or in connection with one or more other processes described elsewhere herein.

In a first aspect, the CSI report is for L1-RSRP reporting or for L1-SINR reporting.

In a second aspect, alone or in combination with the first aspect, the MPE report includes an indication of whether a reference signal identified in the CSI report is associated with an MPE constraint.

In a third aspect, alone or in combination with one or more of the first and second aspects, the CSI reporting configuration includes an indication that the UE is to include the MPE report in the CSI report.

In a fourth aspect, alone or in combination with one or more of the first through third aspects, process 700 includes transmitting information that identifies a mapping of a plurality of power management maximum power reduction value ranges to a plurality of reporting values.

In a fifth aspect, alone or in combination with one or more of the first through fourth aspects, the MPE report includes an indication of a P-MPR value associated with a reference signal identified in the CSI report.

In a sixth aspect, alone or in combination with one or more of the first through fifth aspects, the CSI report identifies multiple groups of reference signals, and a group of reference signals, of the multiple groups of reference signals, includes one or more reference signals.

In a seventh aspect, alone or in combination with one or more of the first through sixth aspects, the MPE report includes a first indication of whether a first set of reference signals, that includes first reference signals of the multiple groups of reference signals having more than one reference signal, is associated with an MPE constraint, and a second indication of whether a second set of reference signals, that includes second reference signals of the multiple groups of reference signals having more than one reference signal, is associated with an MPE constraint.

In an eighth aspect, alone or in combination with one or more of the first through seventh aspects, the first set of reference signals further includes reference signals of the multiple groups of reference signals having only one reference signal.

In a ninth aspect, alone or in combination with one or more of the first through eighth aspects, the MPE report further includes a third indication of whether a third set of reference signals, that includes reference signals of the multiple groups of reference signals having only one reference signal, is associated with an MPE constraint.

In a tenth aspect, alone or in combination with one or more of the first through ninth aspects, the CSI report identifies one or more groups of reference signals, and a group of reference signals, of the one or more groups of reference signals, includes multiple reference signals.

In an eleventh aspect, alone or in combination with one or more of the first through tenth aspects, the MPE report includes a first indication of whether a first set of reference signals, that includes first reference signals of the one or more groups of reference signals, is associated with an MPE constraint, and a second indication of whether a second set of reference signals, that includes second reference signals of the one or more groups of reference signals, is associated with an MPE constraint.

In a twelfth aspect, alone or in combination with one or more of the first through eleventh aspects, the CSI report identifies multiple reference signals, and the CSI report corresponds to a particular report setting.

In a thirteenth aspect, alone or in combination with one or more of the first through twelfth aspects, the MPE report includes an indication of whether the multiple reference signals are associated with an MPE constraint.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
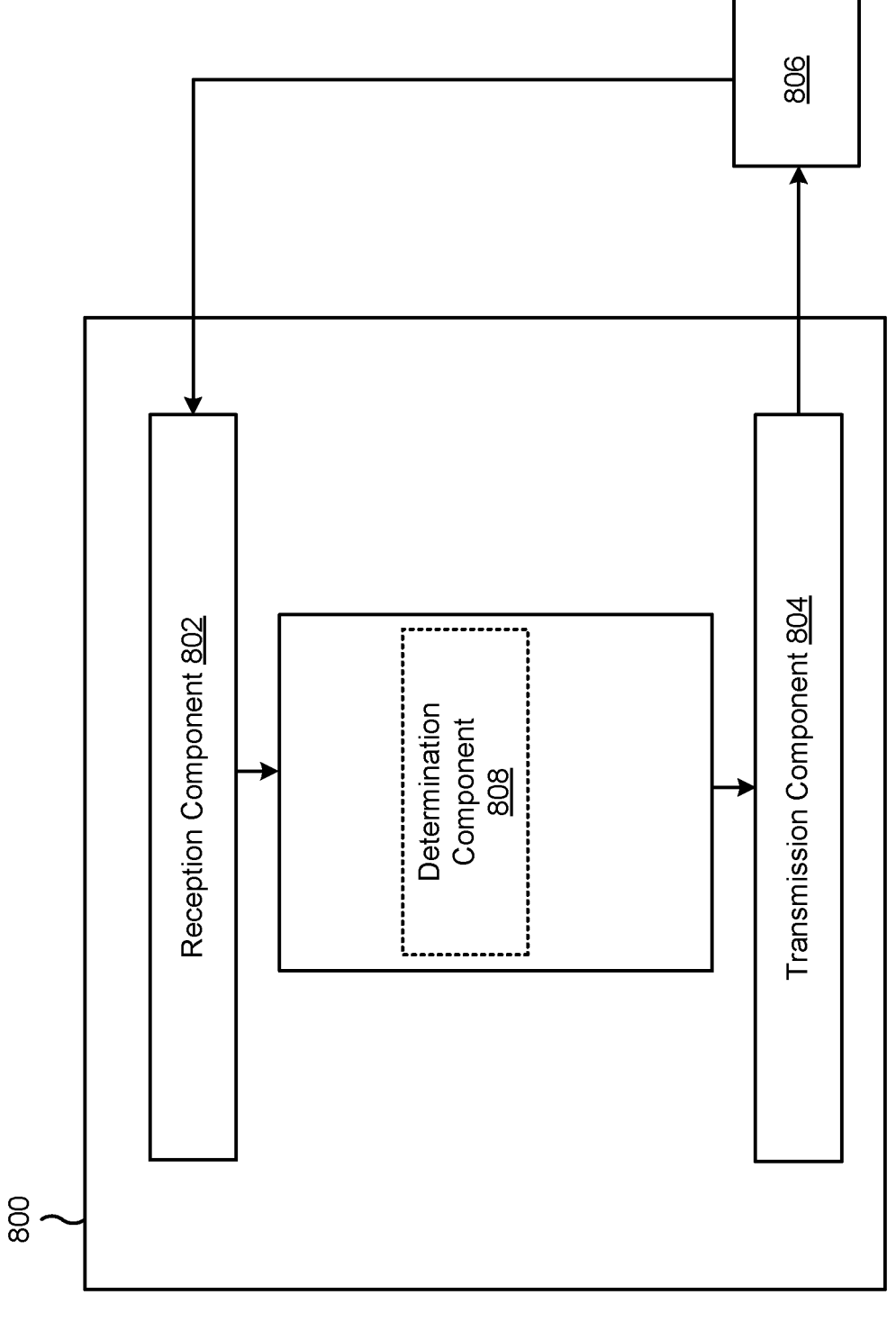
FIGS. 8-9 are block diagrams of example apparatuses for wireless communication, in accordance with various aspects of the present disclosure.

FIG. 8 is a block diagram of an example apparatus 800 for wireless communication, in accordance with various aspects of the present disclosure. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a determination component 808, among other examples.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The reception component 802 may receive, from a base station, a CSI reporting configuration. The transmission component 804 may transmit, to the base station, a CSI report according to the CSI reporting configuration. In some aspects, the CSI report includes an MPE report. In some aspects, the reception component 802 may receive information that identifies a mapping of a plurality of P-MPR value ranges to a plurality of reporting values.

In some aspects, the determination component 808 may determine measurements associated with one or more reference signals. In some aspects, the determination component 808 may determine CSI feedback that is to be reported. In some aspects, the determination component may determine whether one or more beams are subject to an MPE constraint and/or determine an MPE value for one or more beams. In some aspects, the determination component 808 may include a controller/processor, a memory, or a combination thereof, of the UE described above in connection with FIG. 2.

The quantity and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
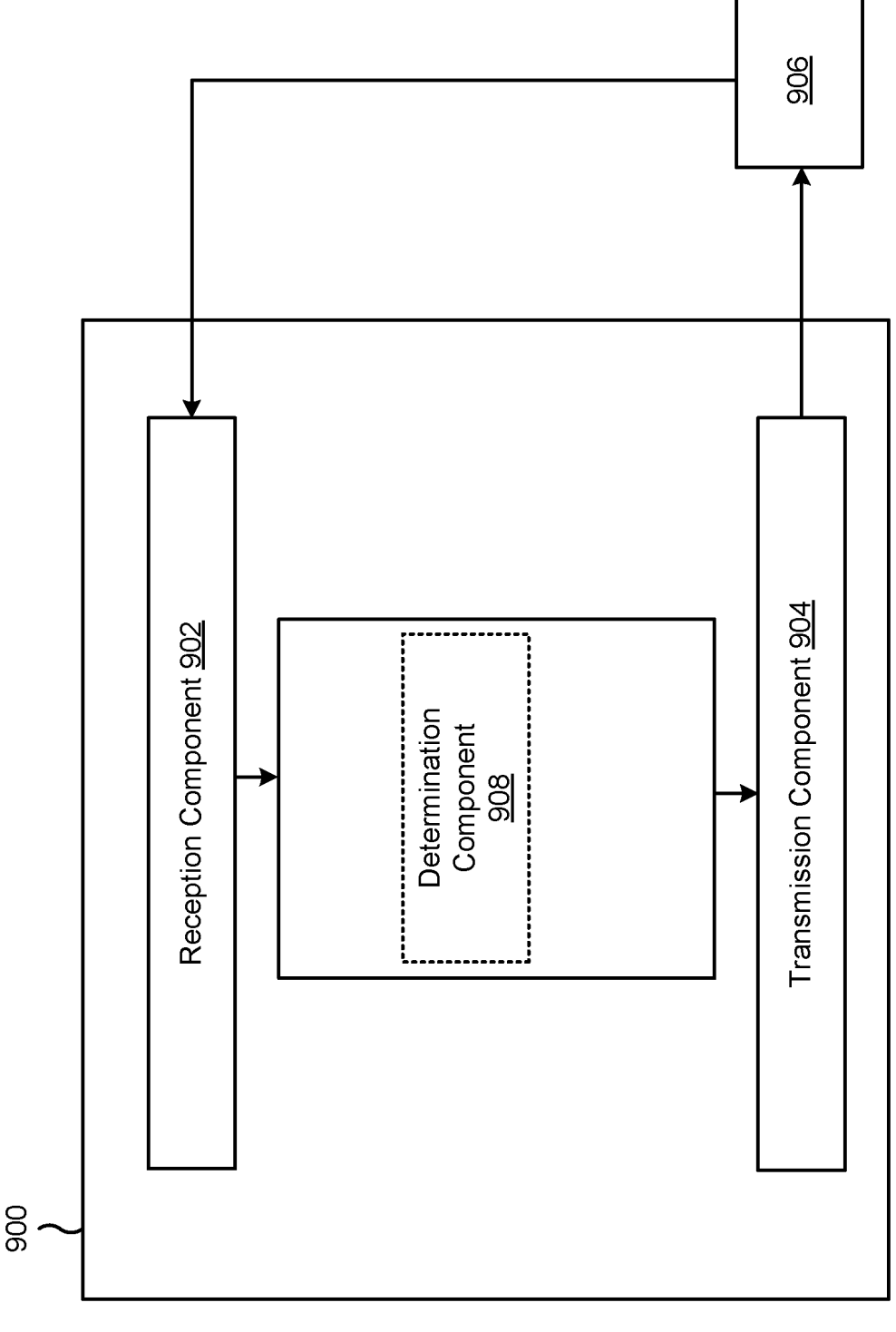

FIG. 9 is a block diagram of an example apparatus 900 for wireless communication, in accordance with various aspects of the present disclosure. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a determination component 908, among other examples.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the base station described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the base station described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the base station described above in connection with FIG. 2. In some aspects, the transmission component 904 may be co-located with the reception component 902 in a transceiver.

The transmission component 904 may transmit, to a UE, a CSI reporting configuration. The reception component 902 may receive, from the UE, a CSI report according to the CSI reporting configuration. In some aspects, the CSI report includes an MPE report. In some aspects, the transmission component 904 may transmit information that identifies a mapping of a plurality of P-MPR value ranges to a plurality of reporting values.

In some aspects, the determination component 908 may determine the CSI reporting configuration. In some aspects, the determination component 908 may determine the mapping of the plurality of P-MPR value ranges to the plurality of reporting values. In some aspects, the determination component 908 may determine one or more beams for the UE based at least in part on the CSI report that includes the MPE report. In some aspects, the determination component 908 may include a controller/processor, a memory, or a combination thereof, of the base station described above in connection with FIG. 2.

The quantity and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some aspects of the present disclosure:

Aspect 1: A method of wireless communication performed by a user equipment (UE), comprising: receiving, from a base station, a channel state information (CSI) reporting configuration; and transmitting, to the base station, a CSI report according to the CSI reporting configuration, the CSI report including a maximum permissible exposure (MPE) report.

Aspect 2: The method of aspect 1, wherein the CSI report is for layer one reference signal received power reporting or for layer one signal to interference plus noise ratio reporting.

Aspect 3: The method of any of aspects 1-2, wherein the MPE report includes an indication of whether a reference signal identified in the CSI report is associated with an MPE constraint.

Aspect 4: The method of any of aspects 1-3, wherein the CSI reporting configuration includes an indication that the UE is to include the MPE report in the CSI report.

Aspect 5: The method of any of aspects 1-4, further comprising: receiving information that identifies a mapping of a plurality of power management maximum power reduction value ranges to a plurality of reporting values.

Aspect 6: The method of any of aspects 1-5, wherein the MPE report includes an indication of a power management maximum power reduction value associated with a reference signal identified in the CSI report.

Aspect 7: The method of any of aspects 1-6, wherein the CSI report identifies multiple groups of reference signals, and a group of reference signals, of the multiple groups of reference signals, includes one or more reference signals.

Aspect 8: The method of aspect 7, wherein the MPE report includes: a first indication of whether a first set of reference signals, that includes first reference signals of the multiple groups of reference signals having more than one reference signal, is associated with an MPE constraint; and a second indication of whether a second set of reference signals, that includes second reference signals of the multiple groups of reference signals having more than one reference signal, is associated with an MPE constraint.

Aspect 9: The method of aspect 8, wherein the first set of reference signals further includes reference signals of the multiple groups of reference signals having only one reference signal.

Aspect 10: The method of aspect 8, wherein the MPE report further includes a third indication of whether a third set of reference signals, that includes reference signals of the multiple groups of reference signals having only one reference signal, is associated with an MPE constraint.

Aspect 11: The method of any of aspects 1-6, wherein the CSI report identifies one or more groups of reference signals, and a group of reference signals, of the one or more groups of reference signals, includes multiple reference signals.

Aspect 12: The method of aspect 11, wherein the MPE report includes: a first indication of whether a first set of reference signals, that includes first reference signals of the one or more groups of reference signals, is associated with an MPE constraint; and a second indication of whether a second set of reference signals, that includes second reference signals of the one or more groups of reference signals, is associated with an MPE constraint.

Aspect 13: The method of any of aspects 1-6, wherein the CSI report identifies multiple reference signals, and the CSI report corresponds to a particular report setting.

Aspect 14: The method of aspect 13, wherein the MPE report includes an indication of whether the multiple reference signals are associated with an MPE constraint.

Aspect 15: A method of wireless communication performed by a base station, comprising: transmitting, to a user equipment (UE), a channel state information (CSI) reporting configuration; and receiving, from the UE, a CSI report according to the CSI reporting configuration, the CSI report including a maximum permissible exposure (MPE) report.

Aspect 16: The method of aspect 15, wherein the CSI report is for layer one reference signal received power reporting or for layer one signal to interference plus noise ratio reporting.

Aspect 17: The method of any of aspects 15-16, wherein the MPE report includes an indication of whether a reference signal identified in the CSI report is associated with an MPE constraint.

Aspect 18: The method of any of aspects 15-17, wherein the CSI reporting configuration includes an indication that the UE is to include the MPE report in the CSI report.

Aspect 19: The method of any of aspects 15-18, further comprising: transmitting information that identifies a mapping of a plurality of power management maximum power reduction value ranges to a plurality of reporting values.

Aspect 20: The method of any of aspects 15-19, wherein the MPE report includes an indication of a power management maximum power reduction value associated with a reference signal identified in the CSI report.

Aspect 21: The method of any of aspects 15-20, wherein the CSI report identifies multiple groups of reference signals, and a group of reference signals, of the multiple groups of reference signals, includes one or more reference signals.

Aspect 22: The method of aspect 21, wherein the MPE report includes: a first indication of whether a first set of reference signals, that includes first reference signals of the multiple groups of reference signals having more than one reference signal, is associated with an MPE constraint; and a second indication of whether a second set of reference signals, that includes second reference signals of the multiple groups of reference signals having more than one reference signal, is associated with an MPE constraint.

Aspect 23: The method of aspect 22, wherein the first set of reference signals further includes reference signals of the multiple groups of reference signals having only one reference signal.

Aspect 24: The method of aspect 22, wherein the MPE report further includes a third indication of whether a third set of reference signals, that includes reference signals of the multiple groups of reference signals having only one reference signal, is associated with an MPE constraint.

Aspect 25: The method of any of aspects 15-20, wherein the CSI report identifies one or more groups of reference signals, and a group of reference signals, of the one or more groups of reference signals, includes multiple reference signals.

Aspect 26: The method of aspect 25, wherein the MPE report includes: a first indication of whether a first set of reference signals, that includes first reference signals of the one or more groups of reference signals, is associated with an MPE constraint; and a second indication of whether a second set of reference signals, that includes second reference signals of the one or more groups of reference signals, is associated with an MPE constraint.

Aspect 27: The method of any of aspects 15-20, wherein the CSI report identifies multiple reference signals, and the CSI report corresponds to a particular report setting.

Aspect 28: The method of aspect 27, wherein the MPE report includes an indication of whether the multiple reference signals are associated with an MPE constraint.

Aspect 29: An apparatus for wireless communication at a device, comprising a processor; memory coupled with the processor; and instructions stored in the memory and executable by the processor to cause the apparatus to perform the method of one or more aspects of aspects 1-14.

Aspect 30: A device for wireless communication, comprising a memory and one or more processors coupled to the memory, the memory and the one or more processors configured to perform the method of one or more aspects of aspects 1-14.

Aspect 31: An apparatus for wireless communication, comprising at least one means for performing the method of one or more aspects of aspects 1-14.

Aspect 32: A non-transitory computer-readable medium storing code for wireless communication, the code comprising instructions executable by a processor to perform the method of one or more aspects of aspects 1-14.

Aspect 33: A non-transitory computer-readable medium storing a set of instructions for wireless communication, the set of instructions comprising one or more instructions that, when executed by one or more processors of a device, cause the device to perform the method of one or more aspects of aspects 1-14.

Aspect 34: An apparatus for wireless communication at a device, comprising a processor; memory coupled with the processor; and instructions stored in the memory and executable by the processor to cause the apparatus to perform the method of one or more aspects of aspects 15-28.

Aspect 35: A device for wireless communication, comprising a memory and one or more processors coupled to the memory, the memory and the one or more processors configured to perform the method of one or more aspects of aspects 15-28.

Aspect 36: An apparatus for wireless communication, comprising at least one means for performing the method of one or more aspects of aspects 15-28.

Aspect 37: A non-transitory computer-readable medium storing code for wireless communication, the code comprising instructions executable by a processor to perform the method of one or more aspects of aspects 15-28.

Aspect 38: A non-transitory computer-readable medium storing a set of instructions for wireless communication, the set of instructions comprising one or more instructions that, when executed by one or more processors of a device, cause the device to perform the method of one or more aspects of aspects 15-28.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

a memory; and one or more processors operatively coupled to the memory, the memory and the one or more processors configured to:

receive, from a base station, a channel state information (CSI) reporting configuration;

receive, from the base station, information that identifies a mapping of a plurality of power management maximum power reduction value ranges to a plurality of reporting values; and transmit, to the base station, a CSI report according to the CSI reporting configuration, the CSI report including a maximum permissible exposure (MPE) report.

2. The UE of claim 1, wherein the CSI report is for layer one reference signal received power reporting or for layer one signal to interference plus noise ratio reporting.

3. The UE of claim 1, wherein the MPE report includes an indication of whether a reference signal identified in the CSI report is associated with an MPE constraint.

4. The UE of claim 1, wherein the CSI reporting configuration includes an indication that the UE is to include the MPE report in the CSI report.

5. The UE of claim 1, wherein the MPE report includes an indication of a power management maximum power reduction value associated with a reference signal identified in the CSI report.

6. The UE of claim 1, wherein the CSI report identifies multiple groups of reference signals, and a group of reference signals, of the multiple groups of reference signals, includes one or more reference signals.

7. The UE of claim 6, wherein the MPE report includes:
a first indication of whether a first set of reference signals, that includes first reference signals of the multiple groups of reference signals having more than one reference signal, is associated with an MPE constraint; and
a second indication of whether a second set of reference signals, that includes second reference signals of the multiple groups of reference signals having more than one reference signal, is associated with an MPE constraint.

8. The UE of claim 7, wherein the first set of reference signals further includes reference signals of the multiple groups of reference signals having only one reference signal.

9. The UE of claim 7, wherein the MPE report further includes a third indication of whether a third set of reference signals, that includes reference signals of the multiple groups of reference signals having only one reference signal, is associated with an MPE constraint.

10. The UE of claim 1, wherein the CSI report identifies one or more groups of reference signals, and a group of reference signals, of the one or more groups of reference signals, includes multiple reference signals.

11. The UE of claim 10, wherein the MPE report includes:
a first indication of whether a first set of reference signals, that includes first reference signals of the one or more groups of reference signals, is associated with an MPE constraint; and
a second indication of whether a second set of reference signals, that includes second reference signals of the one or more groups of reference signals, is associated with an MPE constraint.

12. The UE of claim 1, wherein the CSI report identifies multiple reference signals, and the CSI report corresponds to a particular report setting.

13. The UE of claim 12, wherein the MPE report includes an indication of whether the multiple reference signals are associated with an MPE constraint.

14. A base station for wireless communication, comprising:
a memory; and
one or more processors operatively coupled to the memory, the memory and the one or more processors configured to:
transmit, to a user equipment (UE), a channel state information (CSI) reporting configuration;

transmit, to the UE, information that identifies a mapping of a plurality of power management maximum power reduction value ranges to a plurality of reporting values; and
receive, from the UE, a CSI report according to the CSI reporting configuration, the CSI report including a maximum permissible exposure (MPE) report.

15. The base station of claim 14, wherein the CSI report is for layer one reference signal received power reporting or for layer one signal to interference plus noise ratio reporting.

16. The base station of claim 14, wherein the MPE report includes an indication of whether a reference signal identified in the CSI report is associated with an MPE constraint.

17. The base station of claim 14, wherein the CSI reporting configuration includes an indication that the UE is to include the MPE report in the CSI report.

18. The base station of claim 14, wherein the MPE report includes an indication of a power management maximum power reduction value associated with a reference signal identified in the CSI report.

19. The base station of claim 14, wherein the CSI report identifies multiple groups of reference signals, and a group of reference signals, of the multiple groups of reference signals, includes one or more reference signals.

20. The base station of claim 19, wherein the MPE report includes:
a first indication of whether a first set of reference signals, that includes first reference signals of the multiple groups of reference signals having more than one reference signal, is associated with an MPE constraint; and
a second indication of whether a second set of reference signals, that includes second reference signals of the multiple groups of reference signals having more than one reference signal, is associated with an MPE constraint.

21. The base station of claim 20, wherein the first set of reference signals further includes reference signals of the multiple groups of reference signals having only one reference signal.

22. The base station of claim 20, wherein the MPE report further includes a third indication of whether a third set of reference signals, that includes reference signals of the multiple groups of reference signals having only one reference signal, is associated with an MPE constraint.

23. The base station of claim 14, wherein the CSI report identifies one or more groups of reference signals, and a group of reference signals, of the one or more groups of reference signals, includes multiple reference signals.

24. The base station of claim 23, wherein the MPE report includes:
a first indication of whether a first set of reference signals, that includes first reference signals of the one or more groups of reference signals, is associated with an MPE constraint; and
a second indication of whether a second set of reference signals, that includes second reference signals of the one or more groups of reference signals, is associated with an MPE constraint.

25. The base station of claim 14, wherein the CSI report identifies multiple reference signals, and the CSI report corresponds to a particular report setting.

26. The base station of claim 25, wherein the MPE report includes an indication of whether the multiple reference signals are associated with an MPE constraint.

27. A method of wireless communication performed by a user equipment (UE), comprising:

receiving, from a base station, a channel state information (CSI) reporting configuration;

receiving, from the base station, information that identifies a mapping of a plurality of power management maximum power reduction value ranges to a plurality of reporting values; and transmitting, to the base station, a CSI report according to the CSI reporting configuration, the CSI report including a maximum permissible exposure (MPE) report.

28. A method of wireless communication performed by a base station, comprising:

transmitting, to a user equipment (UE), a channel state information (CSI) reporting configuration;

transmitting, to the UE, information that identifies a mapping of a plurality of power management maximum power reduction value ranges to a plurality of reporting values; and receiving, from the UE, a CSI report according to the CSI reporting configuration, the CSI report including a maximum permissible exposure (MPE) report.

* * * * *